F. VILLIERS.
CASTER.
APPLICATION FILED JAN. 12, 1909.
928,087.
Patented July 13, 1909.
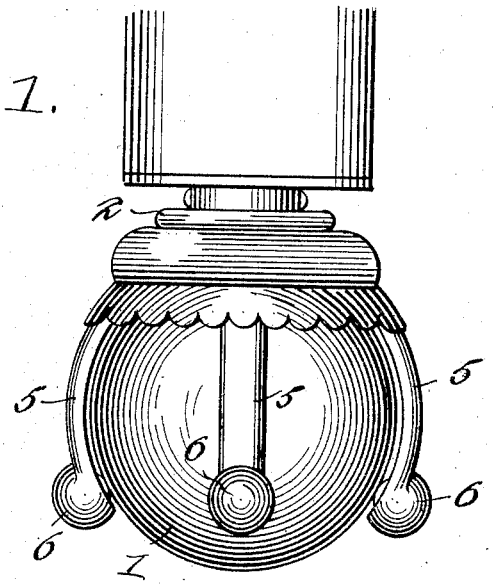
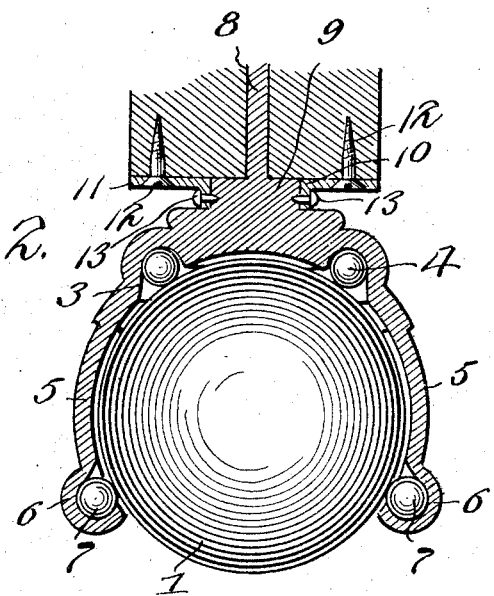
Witnesses
Hugh H. Ott.
R. M. Smith.
Inventor
Frank Villiers
By Victor J. Evans
Attorney

UNITED STATES PATENT OFFICE.

FRANK VILLIERS, OF OKMULGEE, OKLAHOMA.

CASTER.

No. 928,087.  Specification of Letters Patent.  Patented July 13, 1909.

Application filed January 12, 1909. Serial No. 471,944.

*To all whom it may concern:*

Be it known that I, FRANK VILLIERS, a citizen of the United States, residing at Okmulgee, in the county of Okmulgee and State of Oklahoma, have invented new and useful Improvements in Casters, of which the following is a specification.

This invention relates to casters, the object of the invention being to provide a reliable and effective caster for various articles of furniture, the same embodying a main caster ball and a novel form of bearing cap for said ball, which will equalize and distribute the pressure thereon and prevent the escape or displacement of the caster ball from the cap; also a head piece or section adapted to be coupled to and uncoupled from the cap, facilitating the attachment of the device as a whole to a piece of furniture.

With the above and other objects in view, the invention consists in the novel construction, combination and arrangement of parts as herein fully described, illustrated and claimed.

In the drawings:—Figure 1 is a side elevation of the improved caster shown applied to a piece of furniture. Fig. 2 is a vertical diametrical section of the same, showing the main caster ball in elevation.

The improved caster comprises essentially a main and relatively large caster ball 1 which may be of any suitable size according to the character of the furniture in connection with which it is used.

2 designates a cap which fits over and embraces the upper portion of the ball as indicated in Fig. 1, said cap being provided with an annular ball race in which is arranged a circular series of anti-friction balls 4 which sustain the weight of the article relatively to the main caster ball and distribute the weight in a circular path around the upper portion of the main caster ball.

Extending downwardly from the cap 2 is a series of curved arms 5 the lower ends of which are enlarged as shown at 6 and hollowed out to form ball-receiving sockets as shown in Fig. 2, an individual ball 7 being inserted in each one of said sockets as indicated in Fig. 2. The length of the arms 5 is such that the balls 7 touch the main caster ball 1 below the major axis or greatest diameter thereof as clearly shown in the drawings so as to prevent the main caster ball from becoming displaced from its normal position between the arms 5 and beneath the cap 2. The cap 2 is shown as provided with an upwardly extending attaching shank or stem 8 adapted to be inserted in the furniture as shown in Fig. 2 and is also provided with a cylindrical portion 9 extending immediately above the main body of the cap 2 which is adapted to be embraced by the circular flange 10 on a head piece or section 11 provided with openings for the reception of screws 12 or their equivalent whereby the head piece or section 11 may be secured to the furniture as shown in Fig. 2. Fasteners 13 are adapted to be inserted through the flange 10 and brought into engagement with the cylindrical portion 9 of the cap 2 for the purpose of connecting the two sections of the complete caster together and enabling said sections to be readily disconnected to facilitate the application of the head piece 11 to the furiture and the removal of the same therefrom.

It will be observed that all of the weight bears directly downward on the main caster ball, there being no turning action as in the case of ordinary casters now in common use. The larger caster ball is adapted to turn in any direction at any time and to revolve freely against the small anti-fraction balls which rest in contact therewith. The main caster ball is also securely retained in place by the individual balls carried by the downwardly extending arms, which balls bear against the main caster ball at a point below the greatest diameter thereof.

I claim:—

A caster comprising a revoluble caster ball, a cap fitting over the upper portion of the ball and provided with an annular ball race, a circular series of balls in said race, curved arms extending from the cap downward and embracing the main caster ball, and balls carried by the lower ends of said arms and bearing against the main caster ball below the major axis thereof.

In testimony whereof I affix my signature in presence of two witnesses.

FRANK VILLIERS.

Witnesses:
W. B. WILLIAMSON,
ARCH JENNINGS.